United States Patent
Tabayashi et al.

(10) Patent No.: US 10,221,521 B2
(45) Date of Patent: Mar. 5, 2019

(54) TEXTILE PRINTING METHOD, TEXTILE PRINTING DEVICE, INK, AND MEDIUM FOR TRANSFER

(71) Applicant: MIMAKI ENGINEERING CO., LTD., Nagano (JP)

(72) Inventors: Isao Tabayashi, Nagano (JP); Yoshimi Yamada, Nagano (JP); Yuta Shiokawa, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 113 days.

(21) Appl. No.: 15/504,322

(22) PCT Filed: Aug. 19, 2015

(86) PCT No.: PCT/JP2015/073263
§ 371 (c)(1),
(2) Date: Feb. 16, 2017

(87) PCT Pub. No.: WO2016/027835
PCT Pub. Date: Feb. 25, 2016

(65) Prior Publication Data
US 2018/0223475 A1  Aug. 9, 2018

(30) Foreign Application Priority Data

Aug. 20, 2014 (JP) .................... 2014-167176

(51) Int. Cl.
*D06P 1/52* (2006.01)
*B41J 2/01* (2006.01)
(Continued)

(52) U.S. Cl.
CPC .............. *D06P 1/5271* (2013.01); *B41J 2/01* (2013.01); *B41M 5/00* (2013.01); *C09D 11/30* (2013.01);
(Continued)

(58) Field of Classification Search
CPC ... B41M 5/0017; B41M 5/0082; D06P 5/005; D06P 5/30; D06P 5/004; D06P 5/006; D06P 1/5271; C09D 11/30
See application file for complete search history.

(56) References Cited

U.S. PATENT DOCUMENTS

2010/0073408 A1    3/2010  Hale et al.
2015/0273867 A1*  10/2015  Ohnishi ................ B41M 5/382
                                                                347/102

FOREIGN PATENT DOCUMENTS

EP        0561313       9/1993
JP        S52-005843    1/1977
(Continued)

OTHER PUBLICATIONS

"Search Report of Europe Counterpart Application", dated Jul. 12, 2017, p. 1-p. 9.
(Continued)

Primary Examiner — Eisa B Elhilo
(74) Attorney, Agent, or Firm — JCIPRNET

(57) ABSTRACT

A textile printing is more appropriately performed on fabrics made from various materials. A textile printing method of performing textile printing on a textile printing object which is a fabric includes a dye adhesion process of adhering particles of a polyester resin which is a particulate polyester resin, and a dye to the fabric, and a heating process of heating the textile printing object having the particles of the polyester resin and the dye adhered thereto, thereby developing the color of the dye while fixing the particles of the polyester resin to the textile printing object.

15 Claims, 7 Drawing Sheets

(51) Int. Cl.
  *B41M 5/00* (2006.01)
  *C09D 11/30* (2014.01)
  *D06B 1/00* (2006.01)
  *D06P 1/16* (2006.01)
  *D06P 5/00* (2006.01)
  *D06P 5/28* (2006.01)
  *D06P 5/30* (2006.01)

(52) U.S. Cl.
  CPC ............... *D06B 1/00* (2013.01); *D06P 1/16* (2013.01); *D06P 5/002* (2013.01); *D06P 5/004* (2013.01); *D06P 5/005* (2013.01); *D06P 5/006* (2013.01); *D06P 5/30* (2013.01); *D10B 2201/02* (2013.01); *D10B 2501/04* (2013.01)

(56) References Cited

FOREIGN PATENT DOCUMENTS

| | | |
|---|---|---|
| JP | S56-026087 | 3/1981 |
| JP | S62-011782 | 1/1987 |
| JP | S64-068581 | 3/1989 |
| JP | H02-210077 | 8/1990 |
| JP | H03-113081 | 5/1991 |
| JP | H06-057657 | 3/1994 |
| JP | H06-166272 | 6/1994 |
| JP | H10-114865 | 5/1998 |
| JP | H11-092701 | 4/1999 |
| JP | H11-510537 | 9/1999 |
| JP | 2001-501999 | 2/2001 |
| JP | 2002-235288 | 8/2002 |
| JP | 2003-268682 | 9/2003 |
| JP | 2009-249773 | 10/2009 |
| JP | 2012-117168 | 6/2012 |
| JP | 2013-007126 | 1/2013 |
| JP | 2013-059973 | 4/2013 |
| WO | 2014065295 | 5/2014 |
| WO | WO 2014/065295 A1 * | 5/2014 ............ C09D 11/00 |

OTHER PUBLICATIONS

"Office Action of Europe Counterpart Application," dated Mar. 26, 2018, p. 1-p. 5.

"International Search Report (Form PCT/ISA/210)", dated Nov. 17, 2015, with English translation thereof, pp. 1-4.

* cited by examiner

| No. | MAKER | PRODUCT NAME | ITEM NUMBER | TYPE | SOLID CONTENT (%) | ACID NUMBER | SOFTENING POINT | TG |
|---|---|---|---|---|---|---|---|---|
| 1 | UNITIKA LTD. | ELITEL | KA-5071S | THERMOPLASTIC SATURATED COPOLYMER POLYESTER RESIN (COOH) | 30 | 11 | (120) | 67 |
| 2 | | | KT-8701 | | 30 | 7 | (60) | 15 |
| 3 | NIPPON SYNTHETIC CHEMICAL INDUSTRY CO., LTD. | WATER DISPERSION TYPE POLYESTER | WR960 | SATURATED HIGH-MOLECULAR-WEIGHT POLYESTER RESIN (COOH) | 30 | <5 | (90) | 40 |
| 4 | | | W0005 | | 30 | 60-70 | 120 | 70 |
| 5 | GOO CHEMICAL CO., LTD. | PLAS COAT | Z-760 | SATURATED COPOLYMER POLYESTER RESIN (COOH) HAVING TEREPHTHALIC ACID AS MAIN COMPONENT | 25 | 40-55 | 90-105 | 52 |
| 6 | | | Z-900 | PHOSPHORUS-BASED FLAME RETARDANT POLYESTER RESIN (COOH CONTAINING 5% OF PHOSPHORUS) | 25 | <20 | 140-160 | 81 |

FIG. 3

| RESIN EXAMPLE NO. | EVALUATION ITEM | FIRST EXAMPLE INKJET DIRECT PRINTING (1) | SECOND EXAMPLE INKJET DIRECT PRINTING (2) | THIRD EXAMPLE INKJET TRANSFER PRINTING (1) | FOURTH EXAMPLE INKJET TRANSFER PRINTING (2) | FIFTH EXAMPLE PRINTING USING COATING AS PREPROCESSING |
|---|---|---|---|---|---|---|
| 1 | BLEEDING | ○ | ○ | ◎ | ◎ | ○ |
|   | CLEARNESS OF COLOR | ○ | ○ | ◎ | ◎ | ○ |
|   | WATER RESISTANCE | ◎ | ◎ | ◎ | ◎ | ◎ |
|   | TEXTURE OF FABRIC | ○ | ○ | ◎ | ◎ | ○ |
| 2 | BLEEDING | ○ | ○ | ◎ | ◎ | ○ |
|   | CLEARNESS OF COLOR | ○ | ◎ | ◎ | ◎ | ○ |
|   | WATER RESISTANCE | ◎ | ◎ | ◎ | ◎ | ◎ |
|   | TEXTURE OF FABRIC | ◎ | ◎ | ◎ | ◎ | ◎ |
| 3 | BLEEDING | ○ | ○ | ◎ | ◎ | ○ |
|   | CLEARNESS OF COLOR | ○ | ◎ | ◎ | ◎ | ○ |
|   | WATER RESISTANCE | ◎ | ◎ | ◎ | ◎ | ◎ |
|   | TEXTURE OF FABRIC | ◎ | ◎ | ◎ | ◎ | ◎ |
| 4 | BLEEDING | ○ | ○ | ◎ | ◎ | ○ |
|   | CLEARNESS OF COLOR | ○ | ○ | ◎ | ◎ | ○ |
|   | WATER RESISTANCE | ○ | ○ | ○ | ○ | ○ |
|   | TEXTURE OF FABRIC | ○ | ○ | ◎ | ◎ | ○ |
| 5 | BLEEDING | ○ | ○ | ◎ | ◎ | ○ |
|   | CLEARNESS OF COLOR | ○ | ○ | ◎ | ◎ | ○ |
|   | WATER RESISTANCE | ○ | ○ | ○ | ○ | ○ |
|   | TEXTURE OF FABRIC | ○ | ○ | ◎ | ◎ | ○ |
| 6 | BLEEDING | ○ | ○ | ◎ | ◎ | ○ |
|   | CLEARNESS OF COLOR | ○ | ○ | ◎ | ◎ | ○ |
|   | WATER RESISTANCE | ◎ | ◎ | ◎ | ◎ | ◎ |
|   | TEXTURE OF FABRIC | ○ | ○ | ◎ | ◎ | ○ |

FIG. 4

| | APPLICATION AMOUNT | COLOR DEVELOPMENT | STIFFNESS/ FLEXIBILITY | WATER RESISTANCE | FASTNESS TO RUBBING | FASTNESS TO WASHING |
|---|---|---|---|---|---|---|
| GLASS-TRANSITION POINT | — | ALTHOUGH COLOR DEVELOPMENT IS NOT SIGNIFICANTLY INFLUENCED, SLIGHTLY HIGH TG CAUSES SATISFACTORY COLOR DEVELOPMENT | AT LOW TG, PRINTED TEXTILE IS FLEXIBLE, AND IT IS PREFERABLE THAT TG BE 20°C OR LOWER | AT LOWER TG, WATER RESISTANCE IS SUPERIOR, AND IT IS PREFERABLE THAT TG BE 20°C OR LOWER | AT LOWER TG, FASTNESS TO RUBBING IS SUPERIOR, AND IT IS PREFERABLE THAT TG BE 20°C OR LOWER | IN CASE OF WATER-BASED POLYESTER, WHEN TG IS AROUND 20°C, FASTNESS TO WASHING IS SATISFACTORY, AND IN RANGE IN WHICH TG IS LESS THAN 0°C, FASTNESS TO WASHING SUDDENLY DETERIORATES, AND IN CASE OF SOLVENT-BASED POLYESTER, AT LOW TG, FASTNESS TO WASHING IS SUPERIOR, AND IT IS PREFERABLE THAT TG BE 20°C OR LOWER |
| MOLECULAR WEIGHT | — | COLOR DEVELOPMENT IS NOT SIGNIFICANTLY INFLUENCED | STIFFNESS/ FLEXIBILITY IS NOT SIGNIFICANTLY INFLUENCED | WATER RESISTANCE IS NOT INFLUENCED | AT HIGH MOLECULAR WEIGHT, FASTNESS TO RUBBING IS SUPERIOR, AND IT IS PREFERABLE THAT MOLECULAR WEIGHT BE HIGHER THAN 20000 | IN CASE OF WATER-BASED POLYESTER, FASTNESS TO WASHING IS NOT INFLUENCED, WHEREAS IN CASE OF SOLVENT-BASED POLYESTER, IT IS PREFERABLE THAT MOLECULAR WEIGHT BE SMALLER THAN 10,000 OR LARGER THAN 30,000 |
| CRYSTALLINITY | APPLICATION IS DIFFICULT | COLOR DEVELOPMENT DETERIORATES | AT MELTING POINT OR LOWER, PRINTED TEXTILE IS STIFF | | — | — |
| WATER-BASED/ SOLVENT-BASED | IT IS POSSIBLE TO ADD LARGE AMOUNT OF SOLVENT-BASED POLYESTER | COLOR DEVELOPMENT IS NOT SIGNIFICANTLY INFLUENCED | — | IN CASE OF WATER-BASED POLYESTER, AT LOW TG, BREACHING OR SWELLING SOMETIME OCCURS, WHEREAS IN CASE OF SOLVENT-BASED POLYESTER, BREACHING AND SWELLING ARE RARELY SEEN | IN CASE OF WATER-BASED POLYESTER, FASTNESS TO RUBBING IS SUPERIOR | IN CASE OF SOLVENT-BASED POLYESTER, FASTNESS TO WASHING IS SUPERIOR |

FIG. 6A

| No. | MAKER | PRODUCT NAME | ITEM NUMBER | TYPE | SOLID CONTENT (%) | TG (°C) | MOLECULAR WEIGHT | RESULT OBTAINED BY ADHERING POLYESTER TO FABRIC ||||| 
|---|---|---|---|---|---|---|---|---|---|---|---|---|
| | | | | | | | | COLOR DEVELOPMENT | FASTNESS TO RUBBING | WATER RESISTANCE | FASTNESS TO WASHING | STIFFNESS/ FLEXIBILITY |
| 1 | UNITIKA LTD. | ELITEL | ELITEL KT-8803 | WATER-SOLUBLE | 30 | 65 | 15000 | △ | × | △ | × | × |
| 2 | | | ELITEL KT-0507 | WATER-SOLUBLE | 25.3 | -27 | 17000 | △ | × | × | × | ○ |
| 3 | | | ELITEL KZA-1449 | WATER-SOLUBLE | 30 | 41 | 7000 | × | × | ○ | △ | × |
| 4 | TOYOBO CO., LTD. | VYLONAL | MD-1100 | WATER-SOLUBLE | 30 | 40 | 20000 | ○ | ○ | ○ | ○ | × |
| 5 | | | MD-1480 | WATER-SOLUBLE | 25 | 20 | 15000 | ◎ | ○ | ○ | ○ | △ |
| 6 | | | ELITEL UE-3200 | PELLET | 100 | 65 | 16000 | ◎ | △ | × | × | × |
| 7 | | | ELITEL UE-3210 | PELLET | 100 | 45 | 20000 | ○ | × | × | × | × |
| 8 | UNITIKA LTD. | ELITEL UE-3223 | ELITEL UE-3223 | SHEET | 100 | 1 | 21000 | ◎ | △ | ○ | △ | ○ |
| 9 | | | ELITEL UE-3300 | FLAKE | 100 | 45 | 5000 | ◎ | △ | △ | △ | × |
| 10 | | | ELITEL UE-3500 | SHEET | 100 | 35 | 30000 | ◎ | △ | △ | ○ | × |
| 11 | TOYOBO CO., LTD. | VYLON | GK-680 | SHEET | 100 | 10 | 6000 | ◎ | △ | ○ | △ | ○ |

○: FLEXIBLE

FIG. 6B

TEXTILE PRINTING METHOD, TEXTILE PRINTING DEVICE, INK, AND MEDIUM FOR TRANSFER

CROSS-REFERENCE TO RELATED APPLICATION

This application is a 371 of international application of PCT application serial no. PCT/JP2015/073263, filed on Aug. 19, 2015, which claims the priority benefit of Japan application no. 2014-167176, filed on Aug. 20, 2014. The entirety of each of the abovementioned patent applications is hereby incorporated by reference herein and made a part of this specification.

TECHNICAL FIELD

The present invention relates to a textile printing method, a textile printing device, a method of manufacturing a printed textile article, ink, and a medium for transfer.

BACKGROUND ART

In the related art, methods of performing textile printing on a fabric with disperse dyes are known. Also, as those methods, more specifically, a method of directly performing coloring on a fabric with disperse dyes (direct textile printing), and a method in which a transfer medium different from a fabric is used and coloring is performed by transfer from the transfer medium (sublimation transfer) are known.

CITATION LIST

Patent Literature

Patent Literature 1: JP-A-62-11782
Patent Literature 2: JP-A-10-114865
Patent Literature 3: JP-T-11-510537
Patent Literature 4: JP-A-11-92701
Patent Literature 5: JP-A-6-166272
Patent Literature 6: JP-A-6-57657
Patent Literature 7: JP-A-2009-249773
Patent Literature 8: JP-A-2003-268682
Patent Literature 9: JP-A-2013-59973

SUMMARY

Technical Problem

In a case of using such a method of the related art, it is possible to appropriately perform textile printing, for example, on fabrics made from polyester fibers. However, in a case of using fabrics made from other materials, for example, fabrics made from natural fibers, synthetic fibers other than polyester fibers, and various blended fibers, for example, conditions for developing the colors of disperse dyes are not satisfied, and thus it was difficult to appropriately perform textile printing with the disperse dyes. For this reason, in the related art, methods of more appropriately performing textile printing on fabrics made from various materials have been desired. Therefore, an object of the present invention is to provide a textile printing method, a textile printing device, a method of manufacturing a printed textile article, ink, and a medium for transfer capable of solving the above-described problem.

Also, a search for technical literatures related to the present invention was carried out, whereby Patent Literatures 1 to 9 having configurations seemingly similar to that of the present invention were found out. However, the configurations of those literatures are different from that of the present invention in reasons why polyester resins are used and the properties of the polyester resins. For this reason, it is difficult to solve the above-described problem by using only the configurations of Patent Literatures 1 to 9. The configurations and the like disclosed in Patent Literatures 1 to 9 will be described again after a description of the basic configuration of the present invention.

Solution to Problem

In order to achieve the above-described object, the present invention has the following configurations.

(First Configuration)

A textile printing method of performing textile printing on a fabric includes a dye adhesion process of adhering particles of a polyester resin which is a particulate polyester resin and a dye to the fabric, and a heating process of heating the fabric having the particles of the polyester resin and the dye adhered thereto, thereby developing the color of the dye while fixing the particles of the polyester resin to the fabric.

According to this configuration, for example, even in a case of using fabrics made from materials other than polyesters, it is possible to appropriately develop the color of the dye by adhering particles of the polyester resin on the fabrics. More specifically, in this configuration, for example, similarly in a case of performing sublimation transfer printing on polyester fibers, it is possible to vividly develop the color of the dye.

Also, in this case, since particles of the polyester resin which is, for example, a particulate polyester are used, it is possible to adhere the particulate polyester to the surfaces of fibers constituting a fabric, without covering predetermined areas on the fabric with polyester coats (films). Further, in this case, for example, it is possible to adhere particles of the polyester resin on fabrics, without impairing the original textures of the fabrics (for example, the textures of natural fibers). Therefore, according to this configuration, it is possible to more appropriately perform textile printing, for example, on fabrics made from various materials.

Here, the dye which is used in the textile printing method is, for example, a disperse dye. Also, the dye adhesion process adheres the dye to the fabric, for example, by ejecting ink drops of ink containing at least the dye in an inkjet scheme. In this case, the ink is, for example, a liquid which is ejected from an inkjet head. Also, as the ink, aqueous ink (an aqueous ink composition) can be suitably used.

Also, particles of the polyester resin may be adhered to a fabric by ejecting ink drops of ink containing particles of the polyester resin in the inkjet scheme. In this case, for example, ink containing the dye and particles of the polyester resin may be used. Also, it can be considered to use a method other than the inkjet scheme in the dye adhesion process. In this case, for example, it can be considered to adhere particles of the polyester resin to a fabric by a method other than the inkjet scheme.

(Second Configuration)

The fabric is a natural fiber fabric. According to this configuration, it is possible to more appropriately perform textile printing, for example, on fabrics made from various materials.

Also, natural fibers mean, for example, fibers of cotton, wool, and the like. Natural fiber fabrics may be, for example, 100% natural fiber fabrics. Also, natural fiber fabrics may be, for example, fabrics mainly containing natural fibers. In this case, natural fiber fabrics may be, for example, fabrics containing more than 50% of natural fibers. Also, it is preferable that natural fiber fabrics be fabrics containing more than 70% of natural fibers.

(Third Configuration)

The dye adhesion process uses a head for a polyester which is an inkjet head for ejecting ink drops of ink containing particles of the polyester resin, and a head for dye ink which is an inkjet head for ejecting ink drops of ink containing the dye, and ejects ink drops from each of the head for a polyester and the head for dye ink to the fabric, thereby adhering particles of the polyester resin and the dye to the fabric.

According to this configuration, it is possible to appropriately adhere particles of the polyester resin and the dye, for example, to a fabric. Also, in this way, it is possible to more appropriately perform textile printing, for example, on fabrics made from various materials.

Also, in this configuration, it is preferable that, on each position of a fabric, ink drops of the ink containing particles of the polyester resin land first, and then ink drops of the ink containing the dye land. According to this configuration, for example, in the heating process, it is possible to more appropriately fix particles of the polyester resin and more appropriately develop the color of the dye.

(Fourth Configuration)

The dye adhesion process uses an inkjet head for ejecting ink drops of ink containing particles of the polyester resin and the dye, and ejects ink drops from the inkjet head to the fabric, thereby adhering particles of the polyester resin and the dye to the fabric.

According to this configuration, it is possible to appropriately adhere particles of the polyester resin and the dye, for example, to a fabric. Also, in this way, it is possible to more appropriately perform textile printing, for example, on fabrics made from various materials.

(Fifth Configuration)

The dye adhesion process performs transfer from a medium different from the fabric and having particles of the polyester resin and the dye on at least one surface to the fabric, thereby adhering the particles of the polyester resin and the dye to the fabric.

According to this configuration, it is possible to appropriately adhere particles of the polyester resin and the dye, for example, to a fabric. Also, in this way, it is possible to more appropriately perform textile printing, for example, on fabrics made from various materials.

(Sixth Configuration)

The heating process fixes the particles of the polyester resin to the fabric in a manner appropriate for fibers of the fabric. According to this configuration, for example, it is possible to more appropriately adhere particles of the polyester resin to fabrics, without impairing the original textures of the fabrics (for example, the textures of natural fibers).

(Seventh Configuration)

The dye is a sublimation dye whose color is developed by sublimation, and a softening point of particles of the polyester resin is lower than a sublimation temperature of the dye. The softening point of particles of the polyester resin means, for example, a temperature (a melting temperature or a melting point) at which particles of the polyester resin starts to melt. Also, the sublimation temperature of the dye is a temperature (a sublimation point) at which the color of the sublimation dye is developed.

In a case where the softening point of particles of the polyester resin is higher than the sublimation temperature of the dye, in order to sufficiently strongly fix particles of the polyester resin to a fabric, in the heating process, it is required to perform heating to a temperature higher than the sublimation temperature of the dye. However, if heating at a high temperature is performed, the color of the dye may be removed, whereby it may be impossible to appropriately develop the color of the dye.

With respect to this, in this configuration, for example, if heating depending on the sublimation temperature of the dye is preformed in the heating process, fusion bonding of particles of the polyester resin to fibers constituting a fabric progresses first, and then textile printing is performed by sublimation of the disperse dye. Therefore, according to this configuration, for example, it is possible to efficiently and appropriately perform fixing of particles of the polyester resin to a fabric and development of the color of the disperse dye. Also, in this way, it is possible to more appropriately perform textile printing, for example, on fabrics made from various materials.

(Eighth Configuration)

A softening point of particles of the polyester resin is 170° C. or lower. According to this configuration, for example, it is possible to appropriately fix particles of the polyester resin to fabrics, without excessively increasing the heating temperature in the heating process.

Also, in this case, the softening point of particles of the polyester resin is set to be lower than general sublimation temperatures of widely-used disperse dyes. Therefore, according to this configuration, it is possible to more appropriately perform textile printing on fabrics made from various materials, for example, with a general disperse dye.

(Ninth Configuration)

An acid number of particles of the polyester resin is less than 100. The acid number of the resin means how many mg of potassium hydroxide (KOH) is needed to neutralize 1 g of the resin. The acid number of particles of the polyester resin is preferably 80 or less, and is more preferably 50 or less.

In a case of adhering particles of the polyester resin to fabrics, some properties of the polyester may deteriorate water resistance. For example, it is considered that, in a case where the acid number of particles of the polyester resin is 100 or greater, water resistance deteriorates. With respect to this, according to this configuration, for example, it is possible to appropriately improve the water resistance of fabrics subjected to textile printing. Also, in this way, for example, it is possible to appropriately improve the fastness of fabrics to washing.

(Tenth Configuration)

Functional groups of particles of the polyester resin which add the acid number are carboxyl groups. According to this configuration, for example, it is possible to appropriately improve the water resistance of fabrics subjected to textile printing.

Also, as the functional groups determining the acid number of particles of the polyester resin, besides carboxyl groups, sulfonate groups and the like can be considered. However, in this case, it is considered that the water resistance is inferior as compared to the case where the functional groups are carboxyl groups. Also, in the case where the functional groups are sulfonate groups, the viscosity of the ink increases as compared to the case where the functional groups are carboxyl groups. However, for example, in a case of ejecting ink drops of the ink containing particles of the polyester resin in the inkjet scheme, if the viscosity of the ink increases, it is feared that it may become impossible to appropriately perform ejecting of ink drops.

With respect to this, in the tenth configuration, as described above, it is possible to appropriately improve the water resistance of fabrics subjected to textile printing. Also, in this way, for example, it is possible to appropriately improve the fastness of fabrics to washing. Further, even in a case of ejecting ink drops of the ink containing particles of the polyester resin in the inkjet scheme, it is possible to appropriately perform ejecting of ink drops.

(Eleventh Configuration)

A glass-transition temperature TG (Tg) of particles of the polyester resin is equal to or higher than 0° C. and equal to or lower than 100° C. Also, it is preferable that particles of the polyester resin adhered to fabrics keep the particle state at room temperature. To this end, the glass-transition temperature TG of particles of the polyester resin is preferably 15° C. or higher, and is more preferably 50° C. or higher.

In a case where the glass-transition temperature TG of particles of the polyester resin is low, due to the influence of particles of the polyester resin, it becomes easy for sticking or the like to occur on fabrics subjected to textile printing. Also, for example, in a case where the glass-transition temperature TG exceeds 100° C., the textures of fabrics subjected to textile printing become hard. Therefore, in these cases, it is feared that the textures of fabrics subjected to textile printing may be inferior as compared to their original textures.

With respect to this, according to the eleventh configuration, for example, it is possible to appropriately prevent textures from being impaired due to textile printing. Also, in this way, it is possible to more appropriately perform textile printing, for example, on fabrics made from various materials.

(Twelfth Configuration)

Particles of the polyester resin have phosphorus in the chemical structure. According to this configuration, for example, it is possible to impart flame retardancy to fabrics subjected to textile printing.

(Thirteenth Configuration)

The textile printing method further include a solvent-based polyester adhesion process of adhering a solvent-based polyester which is a polyester soluble in an organic solvent to the fabric, and the dye adhesion process is a process which is performed after the solvent-based polyester adhesion process, and adheres particles of the polyester resin to the fabric, using particles of the polyester resin dispersed in an aqueous solvent.

The solvent-based polyester has such a property that it can more easily infiltrate deeply into fibers constituting fabrics. For this reason, in this configuration, the solvent-based polyester which is adhered in the solvent-based polyester adhesion process firmly adheres to fabrics in a state where it has infiltrated into the fibers. Also, in this case, particles of the polyester resin which are adhered to fabrics in the dye adhesion process strongly adhere to the solvent-based polyester, for example, in the subsequent heating process, thereby firmly adhering to the fabrics. Therefore, according to this configuration, it is possible to more thinly adhere particles of the polyester resin, for example, to fabrics. Also, as a result, for example, it is possible to more appropriately improve the fastness to washing (washing resistance) and the like.

(Fourteenth Configuration)

The solvent-based polyester adhesion process uses a head for a solvent which is an inkjet head for ejecting ink drops of a solvent-based polyester solution which is a solution obtained by dissolving the solvent-based polyester in the organic solvent, and ejects ink drops of the solvent-based polyester solution from the head for a solvent, thereby adhering solvent-based polyester to the fabric. According to this configuration, for example, it is possible to appropriately adhere the solvent-based polyester to desired positions on fabrics.

(Fifteenth Configuration)

A textile printing device which is used in the textile printing method according to any one of the first to fourteenth configurations includes an inkjet head configured to eject ink drops of ink containing at least the dye, wherein the inkjet head ejects ink drops of the ink containing the dye at least in the dye adhesion process. According to this configuration, it is possible to more appropriately perform the operation of the dye adhesion process.

Also, this textile printing device may be, for example, an inkjet printer. Also, the inkjet head may eject, for example, ink drops of ink containing particles of the polyester resin and the dye. Also, the textile printing device may include a head for a polyester which is an inkjet head for ejecting ink drops of ink containing particles of the polyester resin, and a head for dye ink which is an inkjet head for ejecting ink drops of ink containing the dye.

(Sixteenth Configuration)

A method of manufacturing a printed textile article by performing textile printing on a fabric includes a dye adhesion process of adhering particles of a polyester resin which is a particulate polyester resin and a dye to the fabric, and a heating process of heating the fabric having the particles of the polyester resin and the dye adhered thereto, thereby developing the color of the dye while fixing the particles of the polyester resin to the fabric. The printed textile article is, for example, a fabric subjected to textile printing. According to this configuration, for example, it is possible to obtain the same effects as those of the first configuration.

(Seventeenth Configuration)

Ink which is used in textile printing on a fabric includes particles of a polyester resin which is a particulate polyester resin, and a dye, and a softening point of particles of the polyester resin is lower than a sublimation temperature of the dye. According to this configuration, for example, it is possible to more appropriately perform textile printing on fabrics made from various materials by the textile printing method shown in the first configuration or the like. Also, as a result, it is possible to obtain the same effects as those of the first configuration. Also, since particles of the polyester resin having the softening point lower than the sublimation temperature of the dye is used, for example, it is possible to obtain the same effects as those of the seventh configuration.

(Eighteenth Configuration)

A medium for transfer which is used in a case of transferring an image drawn with ink for textile printing to a fabric includes a sheet-like base material, and a receiving layer formed on a surface of the base material so as to receive the ink, and the receiving layer contains particles of a polyester resin which is a particulate polyester resin, and in a case of bonding the medium to the fabric by thermocompression, the receiving layer is separated from the base material in a state where the particles of the polyester resin have melted.

In this configuration, it is possible to more appropriately perform textile printing on fabrics made from various materials, for example, by the textile printing method shown in the fifth configuration. Also, as a result, it is possible to obtain the same effects as those of the fifth configuration.

Now, as references related to the above-described configurations, Patent Literatures 1 to 9 will be described. In Patent Literature 1, there is disclosed an aqueous ink which is obtained by solubilizing dyes which are classifiable into a solvent dye and a disperse dye in an aqueous vehicle containing a partially sulfonated polyester resin. Also, in Patent Literature 2, there is disclosed a textile printing method of forming images on fabrics, using a water-soluble polyester having an acid number between 100 and 250, disperse dye ink for inkjet recording using a water-based dispersion of a disperse dye in which the average particle diameter of dispersed particles is 0.25 μm or smaller, and a thermal energy source serving as an ink drop ejection source. These methods are effective in dye dispersion stability. However, in this case, it is difficult to appropriately perform textile printing on natural fibers, synthetic fibers other than polyesters, and various blended fibers.

Also, in Patent Literature 3, there is disclosed a support coloring method including a process of performing printing on a support with ink by a thermal inkjet printer. Also, as the ink which is used in this method, ink containing water (an aqueous medium) and a water-dispersible polyester colored by a disperse dye or a solvent-soluble dye is disclosed. However, in this configuration, since there is a limitation in the concentration of the dye in the polyester dispersed in the ink, it is difficult to obtain high-concentration color development.

Also, in Patent Literature 4, there is disclosed sublimation type dye ink for an inkjet printer, which is obtained by incorporating a sublimation type dye into a polyester resin oligomer. However, in this case, after a necessary amount of the sublimation type dye is incorporated into the polyester resin oligomer, it is required to perform heating until the dye is completely compatibilized, and maintain that temperature (140° C.). For this reason, this method is not a practical method. Also, since the polyester resin oligomer is used, it is feared that the durability of obtained dyed objects may decrease.

Also, in Patent Literature 5, there is disclosed a recording object of a sublimation type thermal transfer recording system having a receiving layer formed on a surface of a base material by applying a resin composition, and hardening the resin composition by activation energy such as ultraviolet light. The resin composition constitutes the receiving layer and contains 40 parts to 95 parts by weight of a dyeing resin composed of 95% to 25% by weight of a polyester resin and 5% to 75% by weight of vinyl chloride-vinyl acetate copolymer and 5 parts to 60 parts by weight of a cross-linking agent curable by activation energy. However, in this case, it is feared that the influence of preprocessing and the receiving layer on the surface of the base material may cause the texture after dying to remarkably deteriorate.

Also, in Patent Literature 6, there are disclosed a method of manufacturing a blended textile of natural fibers and synthetic fibers having a transfer textile printing pattern of a sublimation type disperse dye by intentionally blending synthetic fibers of a polyester or the like which is dyeable with the sublimation type disperse dye with natural fibers of cotton, wool, or the like which is not dyeable with the sublimation type disperse dye by mixed spinning, mixed twisting, knitting, weaving, embroidery, or patch work, thereby making a textile, and thermally pressing transfer paper having an arbitrary pattern formed by applying the sublimation type disperse dye against one surface of the textile, thereby performing transfer printing of the sublimation type disperse dye to the synthetic fiber parts of the textile, and washing away stain attached to the natural fiber parts, and keeping the textile or further dyeing the whole textile, and its product. However, in this case, in order to perform textile printing, it is required to perform a process requiring a lot of time and effort.

Also, in Patent Literature 7, there is disclosed a polyester fabric for inkjet textile printing and a pretreatment agent for obtaining that. The pretreatment agent is composed of 0.1% to 20% by weight of an aqueous composition containing, as a polymer, at least one selected from a group consisting of an acrylic resin, a polyester resin and a urethane resin dispersed or emulsified in water and 0.01% to 10% by weight of an aqueous composition selected as a cross-linking agent from a group consisting of epoxy, methylol melamine, isocyanate, and oxazol, and 1% to 20% by weight of the pretreatment agent is adhered to one surface or both surfaces of a polyester fabric, and the polyester is dried. Thereafter, a disperse dye ink is applied and thermal processing is performed at a cross-linking temperature of the cross-linking agent. However, this pretreatment agent is an agent which is used in a case of performing direct printing on a polyester fabric by an inkjet head. Therefore, only a specified concrete configuration is shown, and specific features are different from those of various embodiments of the present invention. Also, it is not suitable for a method of performing textile printing by sublimation transfer.

Also, in Patent Literature 8, there is disclosed a transfer method of performing sublimation transfer of an image formed on a transfer material with a disperse dye to a transfer object composed of natural fibers or regenerated fibers. This method includes a process of applying a mixed solution of a molten liquid obtained by melting one or more kinds of wax selected from white wax, Japan wax, carnauba wax, paraffin wax containing a polyethylene resin, and hydrogenated palm oil with a solution obtained by dissolving a solid polyester resin in a solvent, a solution obtained by dissolving a solid polyurethane resin in a solvent, or a liquid polyurethane resin, and solidifying the mixed solution, thereby forming a base layer of the mixture of wax and a resin, and a process of performing sublimation transfer of an image of a transfer material of the base layer to the transfer object. However, in this case, since those processes are complicated, it is feared that the cost of textile printing may significantly increase. Also, it is feared that the texture after textile printing may deteriorate.

Also, in Patent Literature 9, there is disclosed a method of manufacturing a transfer medium which is an aqueous liquid. The method includes a colored-layer forming process of forming a colored layer on a base material by ejecting ink from an inkjet head toward the base material, and an adhesion layer forming process of forming an adhesion layer on the colored layer by ejecting an adhesive liquid from an inkjet head toward the colored layer, and the adhesive liquid contains an emulsion type polyester resin having a glass-transition temperature between 10° C. and 70° C. However, this method is a method related to a pigment ink adhesion layer. Therefore, it is difficult to apply the method in a case of using sublimation type textile printing ink.

Advantageous Effects of Invention

According to the present invention, it is possible to more appropriately perform textile printing, for example, on fabrics made from various materials.

BRIEF DESCRIPTION OF DRAWINGS

FIG. 1A is a flow chart illustrating an example of the textile printing method. FIG. 1B to FIG. 1D are views for explaining examples of an operation of a dye adhesion process S102.

FIG. 2A to FIG. 2C show examples of an operation of adhering particles of a polyester resin and a disperse dye to the transfer medium 120 in the dye adhesion process S102. FIG. 2D shows an example of an operation of performing thermocompression bonding. FIG. 2E shows an example of an operation of separating a transfer medium 120 from a textile printing object 100.

FIG. 3 is a table illustrating preferred examples of particles of the polyester resin.

FIG. 4 is a table showing evaluation results of examples.

FIG. 5A simply shows a state in which the solvent-based polyester and particles of a water-based polyester resin are adhered to the textile printing object 100 which is a fabric. FIG. 5B is a table for comparing a result of the best combination in a case of adhering the water-based polyester and the solvent-based polyester to a fabric, thereby performing textile printing, and results in cases of using either the water-based polyester or the solvent-based polyester.

FIGS. 6A-6B are views for explaining items which the inventors of this application studied. FIG. 6A is a table showing examples of the relations between the physical properties of polyesters and the physical properties of fabrics having the polyesters bonded thereto. FIG. 6B is a table showing examples of the water-based polyester and the solvent-based polyester.

DESCRIPTION OF EMBODIMENTS

Figure 1A:
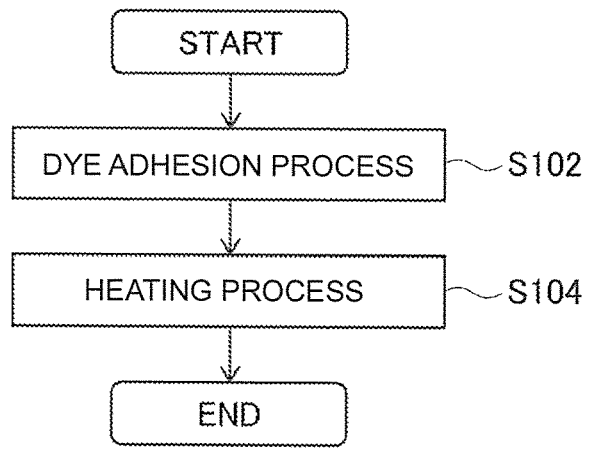
FIGS. 1A-1D are views for explaining a textile printing method according to an embodiment of the present invention.

Hereinafter, an embodiment of the present invention will be described with reference to drawings. FIGS. 1A-1D are views for explaining a textile printing method according to an embodiment of the present invention. FIG. 1A is a flow chart illustrating an example of the textile printing method. This textile printing method is a method of performing textile printing on fabrics. Fabrics mean, for example, fibrous products such as textiles. Also, more specifically, it can be considered to use clothes such as T-shirts, dishcloths, and so on as textile printing object fabrics. Also, in the present example, fabrics may be, for example, textiles, products (such as clothes and dishcloths) manufactured from fabrics.

Also, in the present example, as textile printing object fabrics, natural fiber fabrics are used. In this case, natural fibers mean, for example, fibers of cotton, wool, and the like. Natural fiber fabrics may be, for example, 100% natural fiber fabrics. Also, natural fiber fabrics may be, for example, fabrics mainly containing natural fibers. In this case, for example, it can be considered to use fabrics containing more than 50% of natural fibers. Also, it is preferable that natural fiber fabrics be fabrics containing more than 70% of natural fibers.

Also, the textile printing method of the present example includes a dye adhesion process S102 and a heating process S104. The dye adhesion process S102 is a process of adhering particles of a polyester resin which is a particulate polyester resin and a dye on a fabric. In the present example, in the dye adhesion process S102, for example, an inkjet printer having inkjet heads is used to adhere the dye and the like on a fabric. Also, as the dye, a disperse dye whose color is developed by sublimation is used. Also, the specific operation of the dye adhesion process S102 will be described below in more detail.

The heating process S104 is a process of heating the fabric having the particles of the polyester resin and the dyes adhered thereon. In the heating process S104, the fabric is heated, whereby the particles of the polyester resin are fixed to the fabric and the color of the dye is developed. The heating process S104 may be a process identical to or similar to a heating process which is performed in a case of performing textile printing, for example, on a fabric made from a polyester, with a dye. Also, more specifically, for example, it can be considered to use a heat press machine to heat a fabric in the heating process S104.

According to the present example, for example, even in a case of using fabrics made from materials other than polyesters, it is possible to appropriately develop the color of the dye by adhering particles of the polyester resin on the fabrics. More specifically, in this configuration, for example, similarly in a case of performing sublimation transfer printing on polyester fibers, it is possible to vividly develop the color of the dye.

Also, in this case, since particles of the polyester resin which is, for example, a particulate polyester are used, it is possible to adhere the particulate polyester to the surfaces of fibers constituting a fabric, without covering predetermined areas on the fabric with coats (films). Further, in this case, for example, it is possible to adhere particles of the polyester resin to fabrics, without impairing the original textures of the fabrics (for example, the textures of natural fibers). Therefore, according to the present example, it is possible to more appropriately perform textile printing, for example, on fabrics made from various materials.

In the related art, for example, there is a case of using ink or the like for inkjet printers having a composition containing a polyester as a dispersant or the like. However, this case is different from the present example in the reasons why the polyesters are used, and thus preferred properties of polyester are also different. For this reason, hereinafter, preferred properties of particles of the polyester resin which is used in the present example will be described.

As described above, in the present example, particles of the polyester resin are adhered together with the disperse dye to a fabric, whereby the color of the disperse dye is developed. Also, in this case, for example, the disperse dyes penetrate amorphous regions of particles of the polyester resin, whereby the color of the disperse dye is developed.

Also, in a case of using particles of the polyester resin for a purpose as described in the present example, for example, if the softening point of particles of the polyester resin is higher than the sublimation temperature of the dye, in order to sufficiently strongly fix particles of the polyester resin to fabrics, it is required to perform heating to a temperature higher than the sublimation temperature of the dye in the heating process S104. However, if heating at a high temperature is performed, the colors of the dyes may be removed, and it may be impossible to appropriately develop the color of the dye.

For this reason, in the present example, it is preferable that the softening point of particles of the polyester resin be lower than the sublimation temperature of the disperse dye. In this configuration, for example, if heating depending on the sublimation temperature of the dye is performed in the heating process S104, fusion bonding of particles of the polyester resin to fibers constituting a fabric progresses first, and then textile printing is performed by sublimation of the disperse dye. Therefore, according to this configuration, for example, it is possible to efficiently and appropriately perform fixing of particles of the polyester resin to a fabric and development of the color of the disperse dye. Also, in this way, it is possible to more appropriately perform textile printing, for example, on fabrics made from various materials.

Also, more specifically, it is preferable that the softening point of particles of the polyester resin be equal to or lower than 170° C. According to this configuration, for example, it is possible to set the softening point of particles of the polyester resin so as to be lower than general sublimation temperatures (for example, between 170° C. and 200° C.) of widely-used disperse dyes. Therefore, according to this configuration, it is possible to more appropriately perform textile printing on fabrics made from various materials, for example, with general disperse dyes. Also, for example, it is possible to appropriately fix particles of the polyester resin to fabrics, without excessively increasing the heating temperature in the heating process S104.

Also, in a case of adhering particles of the polyester resin to fabrics, some properties of polyester may deteriorate water resistance. For example, it can be considered that, in a case where the acid number of particles of the polyester resin is large (for example, a case where the acid number is 100 or greater), water resistance deteriorates.

For this reason, it is preferable that the acid number of particles of the polyester resin be less than 100. According to this configuration, for example, it is possible to appropriately improve the water resistance of fabrics subjected to textile printing. Also, in this way, for example, it is possible to appropriately improve the fastness of fabrics to washing. The acid number of particles of the polyester resin is preferably 80 or less, and is more preferably 50 or less.

Also, as functional groups of particles of the polyester resin adding the acid number, for example, carboxyl groups, sulfonate groups, and the like can be considered. However, for example, in a case where the functional groups are sulfonate groups, it is considered that water resistance decreases as compared to a case where the functional groups are carboxyl groups. Also, in the case where the functional groups are sulfonate groups, the viscosity of ink increases as compared to the case where the functional groups are carboxyl groups. Therefore, for example, in a case of ejecting ink drops of ink containing particles of the polyester resin in an inkjet scheme, if the viscosity of the ink increases, it may be impossible to appropriately perform ejecting of ink drops.

For this reason, it is preferable that the functional groups of particles of the polyester resin determining the acid number be carboxyl groups. According to this configuration, for example, it is possible to more appropriately improve the water resistance of fabrics subjected to textile printing. Also, for example, even in a case of ejecting ink drops of ink containing particles of the polyester resin in an inkjet scheme, it is possible to appropriately perform ejecting of ink drops.

Also, in a case of adhering particles of the polyester resin to fabrics like in the present example, it is considered that the textures of fabrics subjected to textile printing depend on the glass-transition temperature TG of particles of the polyester resin. For example, in a case where the glass-transition temperature TG of particles of the polyester resin is low, due to the influence of particles of the polyester resin, it becomes easy for sticking or the like to occur on fabrics subjected to textile printing. Also, for example, in a case where the glass-transition temperature TG exceeds 100° C., the textures of fabrics subjected to textile printing become hard. Therefore, in these cases, it is feared that the textures of fabrics subjected to textile printing may be inferior as compared to their original textures.

For this reason, it is preferable that the glass-transition temperature TG of particles of the polyester resin be equal to or higher than 0° C. and equal to or lower than 100° C. Also, it is preferable that particles of the polyester resin adhered to fabrics keep the particle state at room temperature. To this end, the glass-transition temperature (TG) of particles of the polyester resin is preferably 15° C. or higher, and is more preferably 50° C. or higher. According to this configuration, for example, it is possible to appropriately prevent textures from being impaired due to textile printing.

Also, it is preferable that particles of the polyester resin have phosphorus in the chemical structure. In this case, particles of the polyester resin have phosphorus in the chemical structure, for example, by covalent bonding. According to this configuration, for example, it is possible to impart flame retardancy to fabrics subjected to textile printing.

Also, with respect to the state of the polyester resin which is fixed to fabrics, it is preferable that the heating process S104 fixes particles of the polyester resin to fabrics under conditions appropriate for the fibers of the fabrics. According to this configuration, for example, it is possible to more appropriately adhere particles of the polyester resin to fabrics, without impairing the original textures of the fabrics.

Here, fixing particles of the polyester resin to a fabric on the basis of the fibers of the fabric means, for example, adhering the particulate polyester to the surfaces of the fibers constituting the fabric, without covering predetermined areas on the fabric with coats (films). Also, adhering the particulate polyester to the surfaces of the fibers may mean a state where the polyester adheres to the surfaces of the individual fibers such that it is possible to see the individual fibers, not a state where the polyester adheres to the fibers so as to connect a plurality of fibers. Also, this state may be, for example, a state where the polyester adheres to the fabric so as not to be completely buried in the gaps between the fibers. Also, this state may be, for example, a state where the polyester adheres to the fabric such that the breathability of the fabric is maintained.

Now, the dye adhesion process S102 which is performed in the present example will be described in more detail. In the present example, in the dye adhesion process S102, for example, ink drops of ink containing at least the dye are ejected in an inkjet scheme, whereby the dye is adhered to a fabric. In this case, as the ink, aqueous ink (an aqueous ink composition) can be suitably used. Also, particles of the polyester resin may be adhered to the fabric by ejecting ink drops of ink containing particles of the polyester resin in the inkjet scheme. Also, in this case, for example, ink containing the dye and particles of the polyester resin may be used. Also, it can be considered to use a method other than the inkjet scheme in the dye adhesion process S102. In this case, for example, it can be considered to adhere particles of the polyester resin to the fabric by a method other than the inkjet scheme, for example, by preprocessing. Also, the dye and particles of the polyester resin may be adhered to the fabric by using a medium for transfer (a transfer medium) different from the fabric, without directly adhering the dye and the like to the fabric. Hereinafter, with respect to a more specific operation of the dye adhesion process S102, various examples will be provided.

Figure 1B:
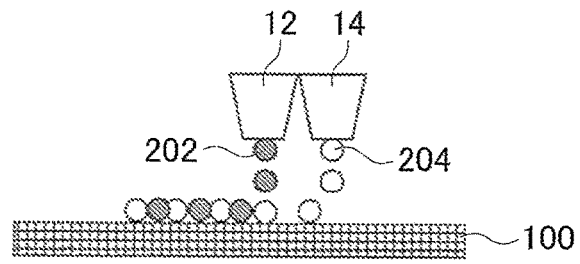
Figure 1C:
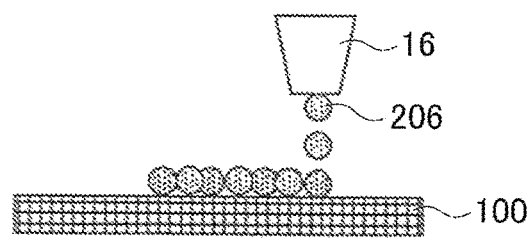
Figure 1D:
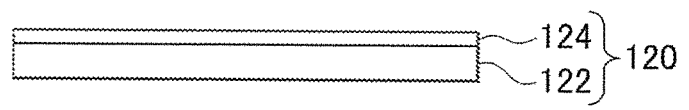

FIG. 1B to FIG. 1D are views for explaining examples of the operation of the dye adhesion process S102. FIG. 1B is a view illustrating an example of the operation of the dye adhesion process S102, and shows an example in a case of using separate inkjet heads for particles of the polyester resin and the dye. In this drawing, a textile printing object 100 is a fabric to be a textile printing object.

In the example shown in FIG. 1B, in the dye adhesion process S102, an inkjet head 12 which is an example of a head for dye ink, and an inkjet head 14 which is an example of a head for the polyester are used, and ink drops are ejected from the inkjet head 12 and the inkjet head 14 to the textile printing object 100, whereby particles of the polyester resin and the dye are adhered to the textile printing object 100. Also, in this case, the inkjet head 12 ejects ink drops 202 of ink containing the disperse dye. Containing the disperse dye may mean, for example, containing minute particles of the disperse dye. Also, the inkjet head 14 ejects ink drops 204 of ink containing particles of the polyester resin. Containing particles of the polyester resin may mean, for example, containing the particulate polyester resin. According to this configuration, for example, it is possible to appropriately adhere particles of the polyester resin and the dye to the textile printing object 100.

Also, this configuration is an example in a case of performing printing on a transfer medium 120 by separately ejecting the ink containing particles of the polyester resin and containing no disperse dye and the ink containing the disperse dye from different nozzles. Also, the inkjet heads mean, for example, liquid ejecting heads for ejecting liquid drops in the inkjet scheme. Also, the ink means, for example, liquids which are ejected from the inkjet heads.

Also, in this configuration, it is preferable that, on each position of the textile printing object 100, ink drops 204 of the ink containing particles of the polyester resin land first, and then make ink drops 202 of the ink containing the dye land. According to this configuration, for example, in the heating process S104 which is subsequently performed, it is possible to more appropriately fix the particles of the polyester resin and more appropriately develop the color of the dye.

FIG. 1C is a view illustrating another example of the operation of the dye adhesion process S102. It can also be considered to adhere the disperse dye and particles of the polyester resin to a textile printing object 100 by one inkjet head 16. For example, in the case shown in FIG. 1C, the inkjet head 16 ejects ink drops 206 of ink containing particles of the polyester resin and the disperse dye. This ink is, for example, an aqueous ink composition containing particles of the polyester resin and the disperse dye. Even in this configuration, it is possible to appropriately adhere particles of the polyester resin and the dye to the textile printing object 100.

FIG. 1D is a view illustrating a further example of the operation of the dye adhesion process S102. As described above, it can also be considered to adhere particles of the polyester resin and the disperse dye to a textile printing object 100 by transfer using a transfer medium 120 different from the textile printing object 100 in the dye adhesion process S102, without directly ejecting ink drops containing the dye and the like to the textile printing object 100.

In this case, the transfer medium 120 is a medium for transfer which is used in a case of transferring an image drawn with ink for textile printing to a textile printing object 100. As the transfer medium 120, for example, transfer paper obtained by forming a release layer 124 on base paper 122, or the like can be suitably used. In this case, the release layer 124 is a layer which is formed by processing the inside or surface of the base paper 122 with a release agent. Also, the transfer medium 120 may be, for example, heat-transfer paper.

Also, in the case of using the transfer medium 120 in the dye adhesion process S102, first, particles of the polyester resin and the disperse dye are adhered to the transfer medium 120, for example, with inkjet heads. Then, transferring from the transfer medium 120 having the particles of the polyester resin and the dye on its surface to the textile printing object 100 is performed, whereby the particles of the polyester resin and the disperse dye are adhered to the textile printing object 100. According to this configuration, it is possible to appropriately adhere particles of the polyester resin and the disperse dye, for example, to the textile printing object 100. Also, particles of the polyester resin may be adhered to the transfer medium 120, for example, by preprocessing.

Figure 2A:
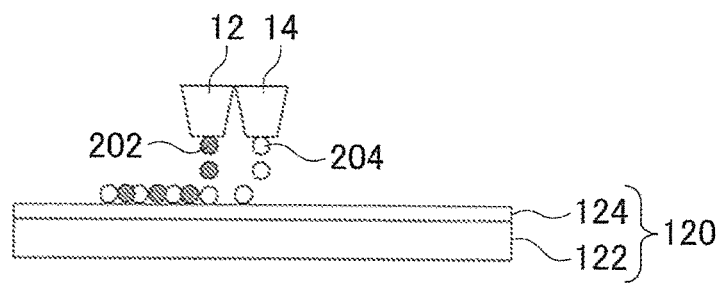
FIGS. 2A-2E are views illustrating examples of an operation in a case of performing textile printing using a transfer medium 120.
Figure 2B:
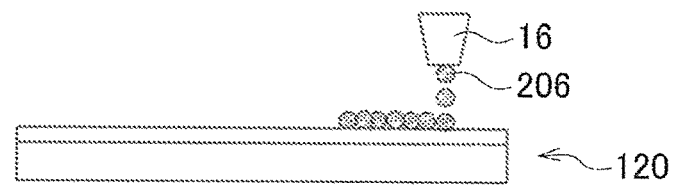
Figure 2C:
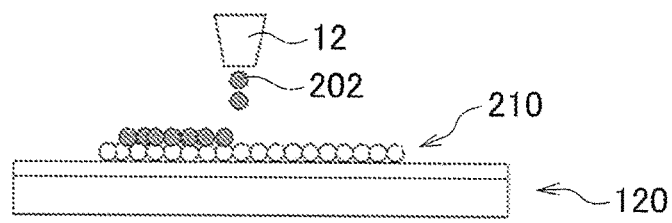

Now, the operation in the case of performing textile printing using a transfer medium 120 will be described in more detail. FIGS. 2A-2E show examples of the operation in the case of performing textile printing using a transfer medium 120. In FIG. 2A to FIG. 2C show examples of the operation of adhering particles of the polyester resin and the disperse dye to a transfer medium 120 in the dye adhesion process S102.

Also, in the present example, in the case of performing textile printing using a transfer medium 120, a part of the operation of the dye adhesion process S102 is performed at the same time as the operation of the heating process S104. More specifically, an operation of performing transfer from a transfer medium 120 to a textile printing object 100 in the dye adhesion process S102 is performed during heating in the heating process S104.

With respect to the case of performing textile printing using a transfer medium 120, FIG. 2A shows an example of the operation of adhering particles of the polyester resin and the disperse dye to a transfer medium 120. In this case, in the dye adhesion process S102, an inkjet head 12 which is an example of a head for dye ink, and an inkjet head 14 which is an example of a head for the polyester are used, and ink drops are ejected from the inkjet head 12 and the inkjet head 14 to the transfer medium 120, whereby particles of the polyester resin and the disperse dye are adhered to the transfer medium 120. The inkjet head 12 and the inkjet head 14 are inkjet heads identical or similar to the inkjet head 12 and the inkjet head 14 described in association with FIG. 1B. According to this configuration, it is possible to appropriately adhere particles of the polyester resin and the disperse dye, for example, to a transfer medium 120.

With respect to the case of performing textile printing using a transfer medium 120, FIG. 2B shows another example of the operation of adhering particles of the polyester resin and the disperse dye to a transfer medium 120. In this case, in the dye adhesion process S102, a common inkjet head 16 for particles of the polyester resin and the disperse dye is used, and ink drops are ejected from the inkjet head 16 to the transfer medium 120, whereby particles of the polyester resin and the dye are adhered to the transfer medium 120. The inkjet head 16 is an inkjet head identical or similar to the inkjet head 16 described in association with FIG. 1C, and ejects ink drops 206 of ink containing particles of the polyester resin and the disperse dye. Even in this configuration, it is possible to appropriately adhere particles of the polyester resin and the disperse dye, for example, to a transfer medium 120.

With respect to the case of performing textile printing using a transfer medium 120, FIG. 2C shows a further example of the operation of adhering particles of the polyester resin and the disperse dye to a transfer medium 120. In this example, preprocessing is performed on the transfer medium 120 with a coating liquid containing particles of the polyester resin (a coating liquid for transfer paper), whereby a receiving layer 210 containing particles of the polyester resin is formed on the transfer medium 120. At the stage when the preprocessing has finished, the transfer medium 120 has a configuration in which the ink receiving layer 210 has been formed on the base paper 122 which is a sheet-like base material. Since this receiving layer 210 is formed, it is possible to more appropriately impart ink receptivity to the transfer medium 120.

Also, with respect to the transfer medium 120 subjected to the above-described preprocessing, an inkjet head 12 which is an example of a head for dye ink is used, and ink drops 202 are ejected from the inkjet head 12 to the transfer medium 120, whereby ink drops 202 containing the disperse dye land on the receiving layer 210. Even in this configuration, it is possible to appropriately adhere particles of the polyester resin and the disperse dye, for example, to a transfer medium 120.

Also, in this configuration, if the transfer medium 120 is bonded to the textile printing object 100 by thermocompression, in a state where the particles of the polyester resin have been melted, the receiving layer 210 is separated from the base paper 122. In this case, for example, the release layer 124 is formed on the base paper 122, and the receiving layer 210 is formed thereon, whereby it is possible to implement a configuration in which particles of the polyester resin are efficiently separated from the base paper 122 during thermocompression bonding. Also, in this way, it is possible to more appropriately perform transfer to the textile printing object 100.

Here, in a case of performing textile printing using a transfer medium 120, after particles of the polyester resin and the disperse dye are adhered to the transfer medium 120 by the method shown in any one of FIG. 2A to FIG. 2C or any other method, the transfer medium is bonded to a textile printing object 100 by thermocompression. Also, by this thermocompression bonding, a part of the operation of the dye adhesion process S102 and the operation of the heating process S104 are performed at the same time.

Figure 2D:
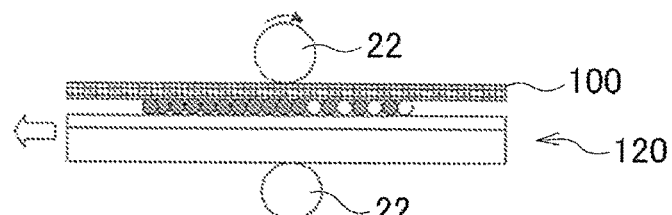

FIG. 2D shows an example of the operation of performing thermocompression bonding. In a case of performing textile printing using a transfer medium 120, thermocompression bonding is performed, for example, by interposing the transfer medium 120 and a textile printing object 100 between a pair of thermocompression bonding rollers 22 in a state where the transfer medium 120 and the textile printing object 100 overlap, and performing heating at a predetermined temperature. By performing thermocompression bonding as described above, for example, it is possible to melt particles of the polyester resin with heat and pressure. Also, in this way, it is possible to sublimate the disperse dye at the same time as the transfer to the textile printing object 100.

Also, the transfer medium 120 and the textile printing object 100 are stacked such that the surface of the transfer medium 120 having the disperse dye adhered thereto and the textile printing object 100 come into contact. Also, for example, it can also be considered to perform thermocompression bonding by interposing the transfer medium 120 and the textile printing object 100 between a flat board-like member (a flatbed) and a roller.

Figure 2E:
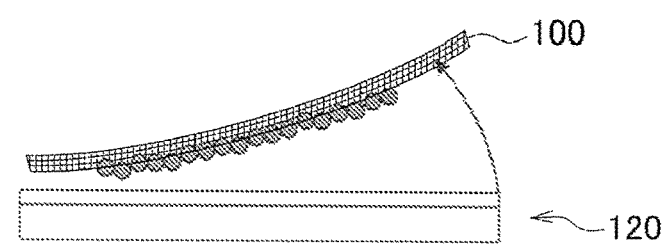

Also, in the case of performing textile printing using the transfer medium 120, after the thermocompression bonding is performed, the transfer medium 120 is separated from the textile printing object 100. FIG. 2E shows an example of the operation of separating the transfer medium 120 from the textile printing object 100. After the thermocompression bonding is performed, the transfer medium 120 is separated from the textile printing object 100, whereby it is possible to obtain the textile printing object 100 having a state where an image has been formed on the textile printing object 100 by textile printing.

As described above, according to the present example, for example, since particles of the polyester resin which is in a minute particle state, and the disperse dye are used, as described with reference to some drawings such as FIG. 1B and FIG. 1C, it is possible to directly perform textile printing on a textile printing object 100 in the inkjet scheme. Also, in this way, it is possible to perform so-called direct textile printing without using transfer paper or the like. Further, in this case, in an image which is obtained by textile printing, it is possible to appropriately achieve clear color development using the disperse dye, for example, unlike a case of using textile printing pigment ink of the related art.

Also, the present invention is not limited to the case of performing direct textile printing, and as described with reference to some drawings such as FIG. 1D and FIGS. 2A-2E, it is possible to perform textile printing using a transfer medium 120. Also, in this case, as the transfer medium 120, for example, existing transfer paper or the like can also be used. Further, even in this case, in an image which is obtained by transfer, it is possible to appropriately achieve clear color development using the disperse dye.

Also, in each method described with reference to FIGS. 1A-1D and FIGS. 2A-2E, for example, it can also be considered to use a polyester curing agent to harden particles of the polyester resin. According to this configuration, it is possible to appropriately improve some properties such as water resistance and fastness to rubbing, and prevent re-sublimation of the disperse dye.

Also, more specifically, as a method using a polyester curing agent, for example, a method in which a polyester curing agent is applied to a fabric which is a textile printing object 100 (the fabric is coated) in advance can be considered. Also, in a case of performing textile printing using a transfer medium 120, a method in which a polyester curing agent is included in the receiving layer 210 which is formed on the transfer medium 120 can be considered. In this case, for example, in the process of transferring particles of the polyester resin on the transfer medium 120 to a textile printing object 100 by thermocompression bonding, simultaneously, it is possible to harden the particles of the polyester resin.

Also, although not shown in the drawings, the method of performing preprocessing using a coating liquid is not limited to the case of using a transfer medium 120, and can also be applied to, for example, the case of directly ejecting ink drops to a textile printing object 100. In this case, ink drops of the ink containing the disperse dye are ejected to a textile printing object 100 subjected to preprocessing, that is, application of the coating liquid containing particles of the polyester resin, by the inkjet head 12. Even in this configuration, it is possible to appropriately adhere particles of the polyester resin and the dye to a textile printing object 100.

Now, the textile printing method of the present example will be described in more detail. First, with respect to ink and particles of polyester resins which can be suitably used in the textile printing method of the present example, specific examples will be described.

In a case of using an inkjet head 12 for ejecting ink drops of ink containing the disperse dye like in the methods shown in FIG. 1B, FIG. 2A and FIG. 2C, as the ink, well-known ink for textile printing can be suitably used. In this case, more specifically, for example, Sb53 ink which is sublimation transfer ink made by MIMAKI ENGINEERING CO., LTD can be suitably used.

Also, in the textile printing method of the present example, as particles of the polyester resin, a well-known water dispersion containing a particulate polyester resin can be suitably used. FIG. 3 is a table showing preferred examples of particles of the polyester resin, and shows product examples which can be suitably used in the present example with respect to the water dispersion containing particles of the polyester resin. These examples are examples of water dispersions containing particles of polyester resins having preferred properties with respect to acid numbers, softening points, and glass-transition temperatures TG. Also, as shown in the drawing, the contents (solid contents) of particles of polyester resins are 30% by weight or 25% by weight. It is preferable that the contents of particles of polyester resins be between 20% by weight and 50% by weight.

Also, in a case of using an inkjet head 14 for ejecting ink drops of ink containing particles of a polyester resin and containing no dye (hereinafter, referred to as a polyester resin particle ink example), for example, like in the methods shown in FIG. 1B and FIG. 2A, it is possible to prepare ink using a water dispersion shown in FIG. 3 (hereinafter, referred to as a water dispersion of a polyester resin example). In this case, for example, the water dispersion of the polyester resin example, ethylene glycol, water, and an acetylenic surfactant are added in the ratio of 70%:20%:9%:1%, and are mixed and dispersed thoroughly, whereby a polyester resin particle ink example is prepared.

Also, in a case of using an inkjet head 16 for ejecting ink drops of ink containing particles of the polyester resin and the disperse dye (hereinafter, referred to as an polyester/dye ink example), for example, like in the methods shown in FIG. 1C and FIG. 2B, it is possible to appropriately use ink obtained by mixing a water dispersion of a polyester resin example and well-known ink for textile printing. In this case, more specifically, for example, ink obtained by adding about 30% of the water dispersion of the polyester resin example to sublimation transfer ink Sb53 and thoroughly stirring the mixture can be appropriately used.

Also, for example, in the case of performing preprocessing using a coating liquid on the transfer medium 120 like in the method shown in FIG. 2C, as a specific coating liquid (hereinafter, referred to as a coating liquid example), for example, a coating liquid obtained by adding a water dispersion of a polyester resin example and an acetylenic surfactant in the ratio of 99%:1% and mixing and dispersing them can be appropriately used. Also, the composition shown as the coating liquid example can be appropriately used, for example, in a case of performing preprocessing on a textile printing object 100.

Now, the textile printing method of the present example will be described in more detail on the basis of examples and the like. The inventors of this application actually performed textile printing on the basis of the configurations of various examples to be described below, and evaluated the results. Also, in each example, as a water dispersion containing particles of a polyester resin, a water dispersion shown in FIG. 3 was used. Also, a textile printing operation in each example was performed similarly to a well-known textile printing operation, except for points to be described below.

First Example: Inkjet Direct Printing (1)

Direct printing was performed on fabrics made from cotton with the ink which is the polyester/dye ink example by a TX-400 type printer made by MIMAKI ENGINEERING CO., LTD. Also, after printing, heating was performed at 200° C. for 90 seconds by a heat press machine. The first example is an example corresponding to the method shown in FIG. 1C.

Second Example: Inkjet Direct Printing (2)

Direct printing was performed on fabrics made from cotton with sublimation transfer ink Sb53 and ink which is a polyester resin particle ink example by a TX-400 type printer, such that ink drops of the polyester resin particle ink example landed earlier than ink drops of Sb53. Also, after printing, heating was performed at 200° C. for 90 seconds by a heat press machine. The second example is an example corresponding to the method shown in FIG. 1B.

Third Example: Inkjet Transfer Printing (1)

Printing was performed on surfaces of transfer media 120 subjected to a silicon peeling process, with ink which is a polyester/dye ink example, by a JV33 type printer made by MIMAKI ENGINEERING CO., LTD. Also, as the transfer media 120, Jetcol 2000 type transfer paper made by Coldenhove Papier was used. Further, after printing, thermocompression bonding was performed at 200° C. for 90 seconds by a heat press machine, whereby transfer to T-shirts made from cotton was performed. The third example is an example corresponding to the method shown in FIG. 2B.

Fourth Example: Inkjet Transfer Printing (2)

Printing was performed on surfaces of transfer media 120 subjected to a silicon peeling process, with sublimation transfer ink Sb53 and ink which is a polyester resin particle ink example by a JV33 type printer such that ink drops of the polyester resin particle ink example landed earlier than ink drops of Sb53. Also, as the transfer media 120, Jetcol 2000 type transfer paper made by Coldenhove Papier was used. Further, after printing, thermocompression bonding was performed at 200° C. for 90 seconds by a heat press machine, whereby transfer to T-shirts made from cotton was performed. The fourth example is an example corresponding to the method shown in FIG. 2A. Also, with respect to the ink drop landing order, ink drops of the polyester resin particle ink example and ink drops of Sb53 may land at the same time.

Fifth Example: Printing Using Coating as Preprocessing

As preprocessing, roll coating using a coating liquid as a coating liquid example was performed on blended fabrics of cotton and urethane. Thereafter, direct printing was performed on the fabrics subjected to the preprocessing (the preprocessed fabrics) with sublimation transfer ink Sb53 by a TX-400 type printer. Also, after printing, heating was performed at 200° C. for 90 seconds by a heat press machine. The fifth example is an example corresponding to a method which is not shown in the drawings. More specifically, the fifth example is an example in a case of performing preprocessing on textile printing objects 100 with a coating liquid and then ejecting ink drops directly to the textile printing objects 100.

FIG. 4 is a table showing the evaluation results of the individual examples. In the table of FIG. 4, Nos. 1 to 6 of resin examples represent Nos. 1 to 6 of water dispersions shown in FIG. 3 with respect to water dispersions containing particles of polyester resins. Also, circle marks represent that satisfactory results were obtained with respect to the evaluation results. Double-circle marks represent that excellent results were obtained with respect to the evaluation results. As can be seen from the table, it was possible to confirm that satisfactory results are obtained in various points with respect to the examples.

Now, a comparative example and reference examples related to the above-described examples will be described. Also, textile printing operations in the comparative example and the reference examples were performed similarly to the operations in the examples, except for points to be described below.

First Comparative Example: Comparison Related to Inkjet Direct Printing

Direct printing was performed on fabrics made from cotton with only sublimation transfer ink Sb53 by a TX-400 type printer, without using ink which is a polyester/dye ink example and ink which is a polyester resin particle ink example. Also, after printing, heating was performed at 200° C. for 90 seconds by a heat press machine. As a result, clear color development like in the examples was not achieved.

First Reference Example: Comparison Related to Inkjet Transfer Printing

As a water dispersion containing particles of a polyester resin, Plas coat Z-687 (having a softening point between 185° C. and 205° C. and a glass-transition temperature TG of 110° C.) made by GOO CHEMICAL CO., LTD. and different from the products shown in FIG. 3 was used. Further, ink identical to the polyester/dye ink example used in the third example was prepared, and printing was performed on Jetcol 2000 type transfer paper made by Coldenhove Papier and having a surface subjected to a peeling process, with the prepared ink, by a JV33 type printer. Furthermore, after printing, thermocompression bonding was performed at 200° C. for 90 seconds by a heat press machine, whereby transfer to T-shirts made from cotton was performed. As a result, it was possible to confirm that color development was appropriately achieved by transfer. However, due to the influence of a high softening point or the like, as compared to the examples, a case where the polyester resin was not sufficiently transferred to a fabric occurred, and there was a case where color development deteriorated. Also, the textures of fabrics become hard.

Second Reference Example: Example of Printing Using Coating as Preprocessing

As a water dispersion containing particles of a polyester resin, a water dispersion type polyester made by Nippon Synthetic Chemical Industry Co., Ltd., and different from the products shown in FIG. 3, and having an acid number of 100, a softening point of 120° C. and a glass-transition temperature TG of 75° C. was used. Further, a coating liquid identical to the coating liquid used in the fifth example was prepared, and roll coating using that coating liquid was performed as preprocessing on blended fabrics of cotton and urethane. Thereafter, direct printing was performed on the fabrics subjected to the preprocessing (the preprocessed fabrics) with sublimation transfer ink Sb53 by a TX-400 type printer. Also, after printing, heating was performed at 200° C. for 90 seconds by a heat press machine. As a result, clear color development was achieved. However, as compared to the examples, water resistance deteriorated, and it became easy for water to drop.

Now, modifications and the like of the textile printing method described above will be described. In the textile printing method described above, as particles of the polyester resin, for example, a well-known water dispersion containing a particulate polyester resin can be suitably used. In this case, the water dispersion containing the polyester resin means, for example, a disperse solution obtained by dispersing particles of the polyester resin in an aqueous solvent. Also, as particles of the polyester resin, for example, resin particles which are particles of a water-based polyester resin (water-based polyester resin particles) may be used. In this case, the water-based polyester resin means, for example, a polyester resin which has a number of hydroxyl groups on the outer side and thus becomes a particle state in an aqueous solvent. Further, since particles of this water-based polyester resin are used, as described above, it is possible to appropriately adhere particles of the polyester resin and the dye to textile printing objects. Also, in this way, for example, even in a case of using fabrics made from materials other than polyesters, it is possible to appropriately develop the color of the dye.

Also, in a case of using fabrics as textile printing objects, it is considered that washing will be repeatedly preformed during use after coloring. Therefore, in a case of performing coloring on fabrics, it is desired to perform coloring by a method in which the fastness to washing (washing resistance) is higher. For this reason, the inventors of this application conducted earnest research on a method capable of improving the fastness to washing. As a result, they found out that it is possible to more appropriately improve the fastness to washing by further using a solvent-based polyester which is a polyester soluble in an organic solvent, not by using only particles of the polyester resin.

More specifically, in this method, prior to the dye adhesion process which is a process of adhering particles of the water-based polyester resin and the dye to a fabric, a solvent-based polyester adhesion process of adhering solvent-based polyester to the fabric is further performed. In this case, the solvent-based polyester means a polyester soluble in an organic solvent. Also, the organic solvent is, for example, a hydrophobic organic solvent. The hydrophobic organic solvent is, for example, an organic solvent having such a property that it is not mixed with water. Also, dissolving the polyester in the organic solvent means, for example, a state where the polyester with a molecule level has been dispersed in the organic solvent, for example, unlike a state where the polyester in a particle state has been dispersed in the solvent. Also, in this case, after the solvent-based polyester adhesion process, in the dye adhesion process, particles of the polyester resin are adhered to the fabric by using particles of the polyester resin dispersed in a water-based solvent.

Here, the solvent-based polyester has such a property that it can more easily infiltrate deeply into fibers constituting fabrics, for example, as compared to the water-based polyester. For this reason, in this configuration, the solvent-based polyester which is adhered in the solvent-based polyester adhesion process firmly adheres to fabrics in a state where it has infiltrated into fibers. Further, in this case, particles of the water-based polyester resin which are adhered to fabrics in the subsequent dye adhesion process are compounded with the solvent-based polyester, for example, in the subsequent heating process, thereby firmly adhering to the fabrics.

Therefore, according to this configuration, it is possible to more firmly adhere particles of the polyester resin, for example, to fabrics. Also, in this way, for example, it is possible to more appropriately improve the fastness to washing (washing resistance) and the like.

Also, in this configuration, the solvent-based polyester adhesion process is performed prior to the dye adhesion process, whereby it is possible to more appropriately make the solvent-based polyester infiltrate into fibers constituting fabrics. More specifically, for example, in a case of performing the dye adhesion process prior to the solvent-based polyester adhesion process, since the fibers of fabrics are covered with water-based polyester films, it is feared that it will be impossible to make the solvent-based polyester sufficiently infiltrate into the fibers in the solvent-based polyester adhesion process. With respect to this, according to this configuration, for example, it is possible to make the solvent-based polyester more appropriately infiltrate fibers constituting fabrics, thereby more surely adhering the water-based polyester to the fibers. Also, since particles of the water-based polyester resin are subsequently adhered, it is possible to more firmly adhere the particles of the water-based polyester resin to the fibers.

Now, the textile printing method which is performed by further using the solvent-based polyester will be described in more detail. Also, the textile printing method which is performed by further using the solvent-based polyester has features identical or similar to those of the textile printing method described with reference to FIGS. 1A-1D to FIG. 4, except for points described above or to be described below.

Figures 5A, 5B:
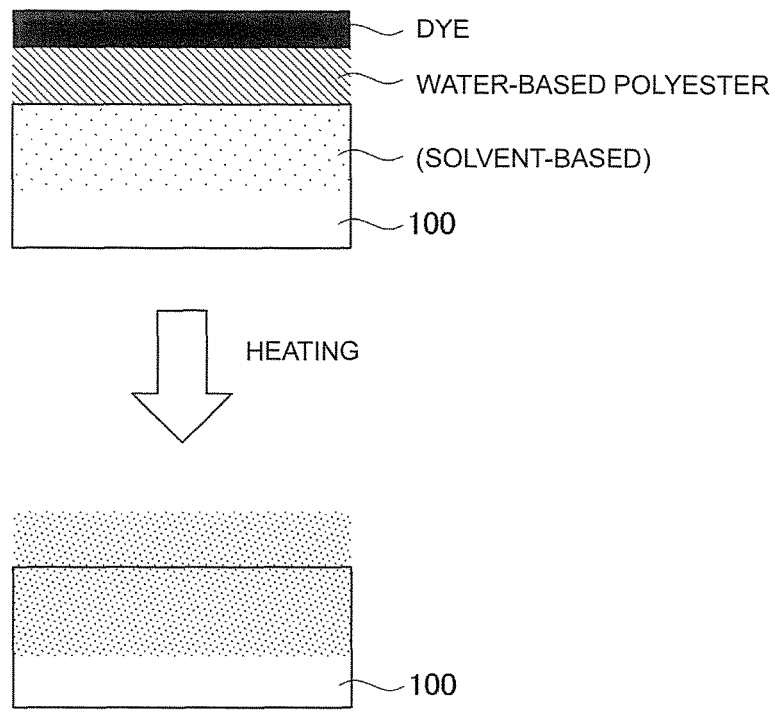
FIGS. 5A-5B are views for explaining the textile printing method further using a solvent-based polyester.

FIGS. 5A-5B are views for explaining the textile printing method which is performed by further using the solvent-based polyester. FIG. 5A schematically shows a state where the solvent-based polyester and particles of the polyester resin adhere to a textile printing object 100 which is a fabric.

As described above, in a case of adhering the solvent-based polyester to a textile printing object 100 which is a fabric by the solvent-based polyester adhesion process, after the solvent-based polyester infiltrates into fibers such as cotton yarn constituting the fabric, in the dye adhesion process, the water-based polyester (particles of the polyester resin) and the dye are further adhered. Therefore, as shown in the upper side of FIG. 5A, the state immediately after the dye adhesion process has been performed becomes schematically a state where a solvent-based polyester resin layer (an organic-solvent-based polyester resin layer) has been formed in the fibers such as cotton yarn, and a resin layer of the water-based polyester (a water-based polyester resin layer) and a dye layer (a colored layer) have been superimposed thereon.

Also, in this case, if the textile printing object 100 is heated in the subsequent heating process, the solvent-based polyester and the water-based polyester are compounded, resulting in, for example, a state shown on the lower side of FIG. 5A. In this case, in the heating process, for example, it is preferable to perform heating at a temperature higher than the glass-transition temperatures TG and pour points of the solvent-based polyester and the water-based polyester. According to this configuration, for example, it is possible to appropriately compound the solvent-based polyester and the water-based polyester. Also, in this way, for example, it is possible to appropriately adhere the hybrid polyester having advantages of both of the solvent-based polyester and the water-based polyester to a textile printing object 100. Also, even in this case, it is possible to appropriately develop the color of the dye by performing heating at a sufficient temperature in the heating process.

Here, in the solvent-based polyester adhesion process, for example, it is preferable to adhere the solvent-based polyester to a textile printing object 100 such that the solvent-based polyester infiltrates into fibers constituting the textile printing object 100, without covering the surface of the textile printing object 100 with a film. According to this configuration, for example, it is possible to more appropriately adhere the solvent-based polyester, without impairing the texture of a fabric which is a textile printing object 100.

Also, in the solvent-based polyester adhesion process, for example, it is preferable to adhere the solvent-based polyester to a textile printing object 100 by using a head for the solvent which is an inkjet head for ejecting ink drops of a solvent-based polyester solution which is a solution obtained by dissolving the solvent-based polyester in an organic solvent, and ejecting ink drops of the solvent-based polyester solution from the head for the solvent. According to this configuration, for example, it is possible to appropriately adhere the solvent-based polyester to desired positions on a textile printing object 100.

Also, according to desired textile printing quality or the like, for example, it can be considered to adhere the solvent-based polyester to a textile printing object 100 by a method other than the method using the head for the solvent. In this case, for example, a method of dipping a textile printing object 100 in a solvent-based polyester solution, a method of spraying a solvent-based polyester solution by a spray, or a method of applying a solvent-based polyester solution with a brush or the like can be considered. By using these methods, for example, it is possible to adhere the solvent-based polyester to a textile printing object 100 in a simple manner.

Also, FIG. 5A shows a case of adhering particles of the polyester resin and the dye directly to a textile printing object 100 in the operation of the dye adhesion process. However, in the dye adhesion process, for example, in a manner identical or similar to that in the case described in association with some drawings such as FIGS. 2A-2E, particles of the polyester resin and the dye may be adhered to a textile printing object 100 in a transfer manner using a transfer medium. Even in this case, in the solvent-based polyester adhesion process, it is preferable to adhere the solvent-based polyester to the textile printing object 100, not to a transfer medium.

Now, effects and the like which are obtained by performing the solvent-based polyester adhesion process will be described in more detail. In general, since water-based polyesters are completely water-based substances, there is an advantage that it is easy to handle them. Also, in a case of using a polyester resin (particles of the polyester resin) which is dispersed in water, it is possible to adhere particles of the polyester resin to fabrics, without impairing the original textures of the fabrics (for example, the textures of natural fibers). However, in general, it is considered that the water resistance of water-based polyesters is inferior as compared to the solvent-based polyesters. For this reason, in a case of simply adhering particles of the polyester resin to a fabric, for example, it is feared that fluff may occur with time and the quality of an image drawn by textile printing may deteriorate. Also, in a case of fixing particles of the polyester resin to fabrics under conditions appropriate for fibers, for example, particles of the polyester resin may be easily peeled off from the fibers, and thus it may be difficult to obtain a high degree of fastness to washing. Also, for example, if the amount of particles of the polyester resin is increased in order to obtain a sufficient degree of fastness to washing, it is feared that stiffness/flexibility of fabrics may deteriorate and the textures may be impaired. Also, in a case of using a flexible resin having a low glass-transition temperature TG in order to improve flexibility/stiffness, it is considered that it is easy for deterioration in image quality to occur.

Meanwhile, in general, solvent-based polyesters can achieve higher water resistance as compared to water-based polyesters. Also, since a variety of solvent-based polyesters having various properties exist, a solvent-based polyester having a glass-transition temperature TG appropriate for desired quality can be selected, whereby it is also possible to control texture. Also, since the solvent-based polyester easily infiltrates into fibers, it becomes possible to more firmly adhere the solvent-based polyester to fibers constituting fabrics.

However, for example, in a case of using only the solvent-based polyester, without using particles of the water-based polyester resin, if the solvent-based polyester is adhered to fabrics under such a condition that high color development can be achieved, sufficient properties may not be obtained under other conditions. More specifically, for example, if the solvent-based polyester is adhered to fabrics under such a condition that satisfactory image quality can be obtained, it is feared that the resin mount of the polyester may excessively increase and the textures of fabrics subjected to textile printing may deteriorate.

With respect to this, the inventors of this application thought the method of performing the solvent-based polyester adhesion process and then perform the dye adhesion process as described above, by earnest research. According to this configuration, for example, by appropriately adhering the hybrid polyester having advantages of both of the solvent-based polyester and the water-based polyester to a textile printing object 100, it is possible to perform textile printing in a state where satisfactory image quality can be obtained, without deteriorating the textures of the fabric.

FIG. 5B is a table for comparing results of the most superior combination in a case where textile printing was performed by adhering the water-based polyester and the solvent-based polyester to fabrics, and results in cases where either the water-based polyester or the solvent-based polyester was used. In this table, a column shown by (1) shows results in a case where textile printing was performed by adhering only the water-based polyester to fabrics. Also, a column shown by (2) shows results in a case where textile printing was performed by adhering only the solvent-based polyester to fabrics. A column shown by (1)+(2) shows results in a case where textile printing was performed by adhering the water-based polyester and the solvent-based polyester to fabrics. Also, in every case, as a solvent, methyl ethyl ketone was used.

Also, the table shown in FIG. 5B was obtained by using a method of dipping fabrics in a solution containing the polyester, not a method of using inkjet heads, as a method of adhering polyester to fabrics, in order to facilitate experiments. Therefore, more strictly, it is considered that the evaluation results of the individual items are different from, for example, those in a case of using inkjet heads. More specifically, for example, it can be considered that, in the results of evaluation on the fastness to washing and stiffness/flexibility, the influence of difference in the adhesion amount of the polyester occurs. However, it is considered that the case of using the solvent-based polyester and the water-based polyester is the same as a case of using inkjet heads in that it is possible to appropriately adhere the hybrid polyester having advantages of both of them to textile printing objects 100.

Also, in this evaluation, as fabrics, cotton fabrics were used. Also, as the water-based polyester, water-based polyester MD-1480 made by TOYOBO CO., LTD. and having a medium glass-transition temperature TG (TG=20° C.) was used. Also, as the solvent-based polyester, solvent-based polyester VYLON GK-680 made by TOYOBO CO., LTD. and having a low glass-transition temperature TG (TG=10° C.) was used. In (1), 14% by weight of MD-1480 was used, and in (2), 46% by weight of GK-680 was used, and in (1)+(2), both of the water-based polyester and the solvent-based polyester were used, and when the weight of a fabric (cotton) was 100% by weight, MD-1480 and VYLON GK-680 were used at the ratio of 6% by weight:12% by weight.

In this case, as shown in the table, for example, it can be seen that it is possible to improve the water resistance and the flexibility/stiffness while maintaining the fastness, without significantly increasing the resin amount of the used water-based polyester be adhered to fabrics. In this case, for example, it is preferable to appropriately adjust the amount of each of the water-based polyester and the water-based polyester as long as the total resin amount of them becomes between 5% by weight and 25% by weight.

Now, a supplementary description of various features of the water-based polyester and the solvent-based polyester will be made. Also, the following supplementary description will show the content of the earnest research conducted by the inventors of this application, from a variety of angles. To this end, not only items associated directly with the features of the present invention, but also related items will be described.

FIGS. 6A-6B are views for explaining items which the inventors of this application examined. FIG. 6A is a table showing examples of the relations between the physical properties of polyesters and the physical properties of fabrics having the polyesters adhered thereto. As shown in this table, the physical properties of the fabrics having the polyesters adhered thereto variously change on the basis of the physical properties of the adhered polyesters.

FIG. 6B is a table showing examples of water-based polyesters and solvent-based polyesters, and shows examples of polyesters which the inventors of this application used in various experiments. As shown in the table, in cases where only a water-based polyester was adhered to fabrics, there was a problem that the flexibility/stiffness, the fastness to rubbing, the water resistance, and the fastness to washing were inferior. In cases where only a solvent-based polyester was adhered to fabrics, color development was satisfactory, and there were some fabrics having flexibility and having a feature that the fastness to rubbing, the water resistance, and the fastness to washing were not inferior as compared to water-based polyesters. Therefore, in a case of using a combination of a water-based polyester and a solvent-based polyester, it is preferable to use a solvent-based polyester superior than water-based polyesters in the fastness to rubbing, the water resistance, and the fastness to washing. In this case, the fastness to rubbing, the water resistance, and the fastness to washing are properties in each case where either a water-based polyester or a solvent-based polyester was adhered to a fabric. Also, from among the polyesters shown in the table, MD-1480 and VYLON GK-680 are resins which caused the most satisfactory properties in the experiments described in association with FIG. 5B.

Also, it is preferable to determine resins to be used by performing evaluation on items according to quality desired for textile printing object fabrics. More specifically, for example, with respect to polyesters to be used, it can be considered to perform evaluation on water resistance and fastness to rubbing (under a wet condition and a dry condition). In this case, with respect to evaluation on those items, for example, evaluation may be performed on each polyester resin.

Also, in addition to evaluation on each polyester resin, it is preferable to further perform evaluation in a state where each polyester has been adhered to fabrics (such as cotton). In this case, for example, it is preferable to perform a variety of evaluation while variously changing the adhesion amount (application amount) of each polyester.

Also, in addition to this evaluation, it is preferable to further perform evaluation after textile printing (printing) is performed on the fabrics having each polyester adhered thereto. In this case, for example, it is preferable to perform evaluation on color development, fastness to rubbing, water resistance/washing resistance, fastness to washing, and stiffness/flexibility.

Although the disclosure has been described above by way of the embodiment, the technical scope of the disclosure is not limited to the scope described in the embodiment. It is apparent to those skilled in the art that it is possible to make various changes or modifications in the above described embodiment. It is apparent from a description of claims that forms obtained by making such changes or modifications can also be included in the technical scope of the disclosure.

INDUSTRIAL APPLICABILITY

The present invention can be suitably used, for example, in textile printing methods.

The invention claimed is:

1. A textile printing method of performing textile printing on a fabric, comprising:
   a dye adhesion process of adhering particles of a polyester resin which is a particulate polyester resin and a dye to the fabric; and
   a heating process of heating the fabric having the particles of the polyester resin and the dye adhered thereto, thereby developing a color of the dye while fixing the particles of the polyester resin to the fabric;
   wherein the dye adhesion process uses:
      a head for a polyester which is an inkjet head for ejecting ink drops of ink containing particles of the polyester resin; and
      a head for dye ink which is an inkjet head for ejecting ink drops of ink containing the dye, and
      in the dye adhesion process, ink drops from each of the head for the polyester and the head for dye ink are ejected to the fabric, thereby adhering particles of the polyester resin and the dye to the fabric.

2. The textile printing method according to claim 1, wherein
   the fabric is a natural fiber fabric.

3. The textile printing method according to claim 1, wherein
   the dye adhesion process uses an inkjet head for ejecting ink drops of ink containing particles of the polyester resin and the dye, and
   in the dye adhesion process, ink drops from the inkjet head are ejected to the fabric, thereby adhering particles of the polyester resin and the dye to the fabric.

4. A textile printing method of performing textile printing on a fabric, comprising:
   a dye adhesion process of adhering particles of a polyester resin which is a particulate polyester resin and a dye to the fabric; and
   a heating process of heating the fabric having the particles of the polyester resin and the dye adhered thereto, thereby developing a color of the dye while fixing the particles of the polyester resin to the fabric;
   wherein
   in the dye adhesion process, particles of the polyester resin and the dye are disposed on at least one surface of a medium different from the fabric and a transfer is performed from the medium to the fabric, thereby adhering particles of the polyester resin and the dye to the fabric.

5. The textile printing method according to claim 1, wherein
   the dye is a sublimation dye whose color is developed by sublimation, and
   a softening temperature of particles of the polyester resin is lower than a sublimation temperature of the dye.

6. The textile printing method according to claim 1, wherein
   a softening temperature of particles of the polyester resin is 170° C. or lower.

7. The textile printing method according to claim 1, wherein
   an acid number of particles of the polyester resin is less than 100.

8. The textile printing method according to claim 7, wherein
   functional groups of particles of the polyester resin which add the acid number are carboxyl groups.

9. The textile printing method according to claim 1, wherein
   a glass-transition temperature TG of particles of the polyester resin is equal to or higher than 0° C. and equal to or lower than 100° C.

10. The textile printing method according to claim 1, wherein
    particles of the polyester resin have phosphorus in its chemical structure.

11. The textile printing method according to claim 1, further comprising:
    a solvent-based polyester adhesion process of adhering a solvent-based polyester which is a polyester soluble in an organic solvent to the fabric,
    wherein the dye adhesion process is a process which is performed after the solvent-based polyester adhesion process, and adheres particles of the polyester resin to the fabric, using particles of the polyester resin dispersed in an aqueous solvent.

12. The textile printing method according to claim 11, wherein
    the solvent-based polyester adhesion process uses a head for a solvent which is an inkjet head for ejecting ink drops of a solvent-based polyester solution which is a solution obtained by dissolving the solvent-based polyester in the organic solvent, and
    in the solvent-based polyester adhesion process, ink drops of the solvent-based polyester solution are ejected from the head for the solvent, thereby adhering the solvent-based polyester to the fabric.

13. A textile printing system of performing textile printing on a fabric, comprising:
- a head for a polyester which is an inkjet head for ejecting ink drops of ink containing particles of a polyester resin;
- a head for dye ink which is an inkjet head for ejecting ink drops of ink containing a dye; and
- a heater for heating the fabric having the particles of the polyester resin and the dye adhered thereto, thereby developing a color of the dye while fixing the particles of the polyester resin to the fabric;
- ink drops from each of the head for the polyester and the head for dye ink are ejected to the fabric, thereby adhering particles of the polyester resin and the dye to the fabric;
- wherein the inkjet head ejects ink drops of the ink containing the dye at least in the dye adhesion process.

14. An ink which is used in textile printing on a fabric, comprising:
- particles of a polyester resin which is a particulate polyester resin; and
- a dye,
- wherein a softening point of particles of the polyester resin is lower than a sublimation temperature of the dye;
- wherein particles of the polyester resin have phosphorus in its chemical structure.

15. A medium for transfer which is used in a case of transferring an image drawn with an ink for textile printing to a fabric, comprising:
- a sheet-like base material; and
- a receiving layer formed on a surface of the base material so as to receive the ink,
- wherein the receiving layer contains particles of a polyester resin which is a particulate polyester resin, and
- in a case of bonding the medium to the fabric by thermocompression, the receiving layer is separated from the base material in a state where the particles of the polyester resin has been melted.

* * * * *